April 27, 1926.
A. E. DEMERS
1,582,133
LENS MEASURE
Filed April 18, 1922
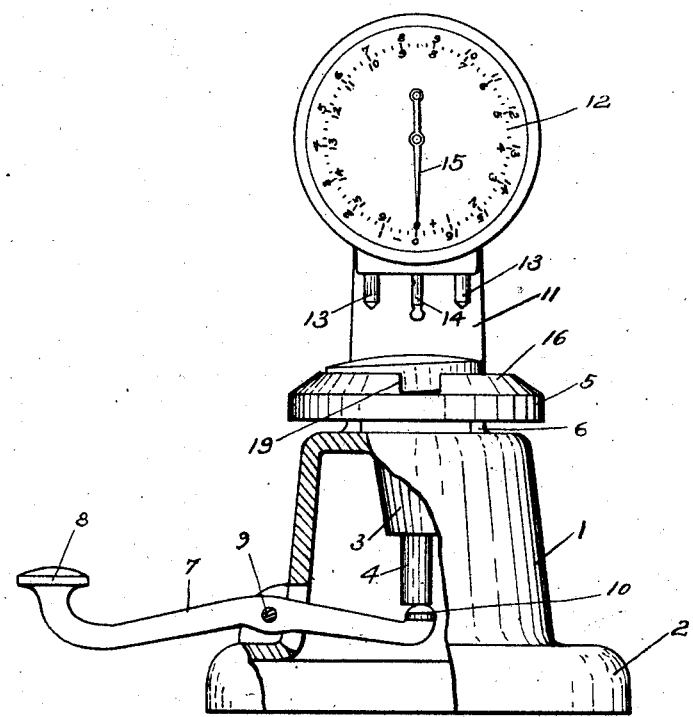
FIG. I
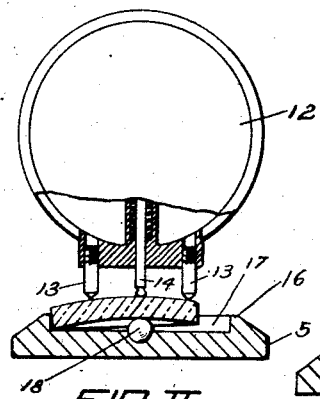
FIG. II
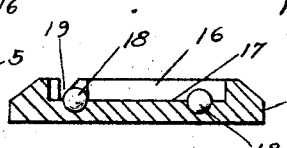
FIG. IV
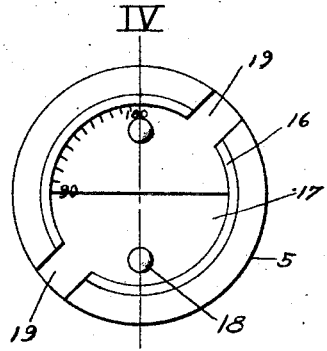
FIG. III
INVENTOR
A. E. DEMERS
BY
*H. H. Styll & A. K. Parsons*
ATTORNEYS Patented Apr. 27, 1926.

1,582,133

UNITED STATES PATENT OFFICE.

ARTHUR EDWARD DEMERS, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS MEASURE.

Application filed April 18, 1922. Serial No. 554,923.

*To all whom it may concern:*

Be it known that I, ARTHUR E. DEMERS, a citizen of the United States, residing at Southbridge, in the county of Worcester and State of Massachusetts, have invented certain new and useful Improvements in Lens Measures, of which the following is a specification.

This invention relates to new and useful improvements in lens measuring instruments and more particularly to a lens measure including means for correctly positioning the lens for measurement. The main object of the present invention is the provision of a suitable support for lenses upon which the lens is mounted and wherein the lens is balanced so that when the contacting points of the measure engage the lens the lens will readily accommodate itself to the engaging points for obtaining the correct measurement.

Another object of the invention is the provision of a lens measuring instrument having a movable supporting element for the lens and provided with a rotatable indicator above the lens support, said indicator being provided with engaging points adapted to contact with the lens and correctly position the lens upon the supporting member whereby to obtain the correct measurements.

A further object of the invention is the provision of a lens measuring instrument including a stationary measure having the usual contacting points and a lens supporting table provided with diametrically opposed spaced bearing members upon which the lens is mounted whereby when the table is raised for engaging the lens with the contacting points of the measure, the lens will be readily moved to correctly position itself against the points of the measure so that an accurate measure of the lens can be obtained.

With the above and other objects in view the invention consists in the novel features of construction, the combination and arrangement of parts hereinafter more fully set forth, pointed out in the claims and shown in the accompanying drawings, in which—

Figure I is a front elevation of a lens measuring instrument constructed in accordance with my invention, parts thereof being broken away and illustrated in cross section.

Figure II is a detail section, parts of the measure being shown in elevation, disclosing the correct positioning of a lens with respect to the contacting points.

Figure III is a top plan view of the lens supporting table, and

Fig. IV is a transverse sectional view taken on the line IV—IV of Figure III

In carrying out my invention I provide a standard 1 preferably hollow and provided with a base portion 2. The standard 1 is provided with a centrally arranged sleeve 3 which extends downwardly into the standard 1 and provides a suitable guide and bearing for the movable plunger 4 which carries the lens supporting table 5. The member 5 when in an inoperative position rests upon the annular flange 6 at the top of the standard 1.

Movement is imparted to the plunger 4 by means of the lever 7, the inner end of which contacts with the lower end of the plunger 4, while the outer end thereof is provided with a treadle 8, said lever being pivoted to the standard 1 and supported by means of the pivot pin 9 whereby downward movement on the part of the treadle will raise the contacting point 10 against the lower end of the plunger 4, moving the plunger 4 upwardly which in turn will move the table 5 upwardly, said movement being parallel with the upright bracket 11, said bracket supporting a lens measure 12 having the usual stationary points 13 and movable pin 14, the movable pin having operative connection with the indicator 15 which is adapted to be moved over the dial of the measure upon reciprocating movement of the pin 14.

The upper face of the table 5 is provided with an annular flange 16 forming a suitable receptacle 17 for the lens. Arranged within the receptacle 17 and disposed in diametrically opposite points are the metal bearing balls or fulcrums 18, said balls being arranged in close proximity to the annular flange 16 so that when a lens is arranged within the receptacle 17 the edge of the lens will rest upon the balls 18 so that when the table 5 is moved upwardly to bring the lens into contact with the points 13 and 14, the movement of the lens on the balls acting as fulcrums will permit the lens to correctly position itself against the points 13 and 14 as illustrated in Fig. II The balls 18 constitute an important feature of my invention in that they make the instrument universal in its use, as all forms of lenses can be measured. By way of illustration, suppose that a prism lens having one edge thereof considerably thicker than the other is laid on the table 5 when the balls 18 are not provided. When the table is raised toward the lens measure 12 the thicker edge of the lens will contact with one of the stationary contacts 13 and the other stationary contact will not be able to contact with the thinner edge of the lens, thus making it impossible to determine the curvature of the lens to be measured. However, by having the table 5 provided with the diametrically opposed spaced bearing members or balls 18 which will act as a fulcrum for the lens when being measured, every type of lens can be measured without difficulty. It is to be remembered that a line drawn through the two contacts 13 would be at right angles to a line drawn through the balls 18 so that when a lens is placed on the balls and moved into contact with the lens measure one of the stationary contacts will strike the thickest edge of the lens and as the lens is fulcrumed will force the same downwardly, while the thinner edge will be swung upwardly until it strikes the other contact, whereupon the curvature of the lens may be ascertained.

From the above it will be readily apparent that curved lenses may be quickly and readily measured with my improved measure regardless of any prism effect in the lens as the various thicknesses of the lens will be accommodated for by having the lens resting upon the fulcrum balls 18 so that when the lens engages the points 13 and 14 it will be readily moved to its correct position upon the balls so that the correct measurement of the lens can be obtained. In order to facilitate the removal of the lens from the receptacle 17 suitable finger slots 19 are formed in the upper face of the table 5 so that the operator's fingers may be readily engaged with the edge of the lens to remove the same for the receptacle.

Attention is called to the fact that various types of metal can be used in forming the fulcrum balls 18 although it is preferred to have these balls formed of steel and set within suitable pockets to prevent them from becoming readily removed.

What I claim is—

1. A device of the class described including a supporting standard, a stem mounted for reciprocating movement within said standard, a table at the upper end of the stem, an annular flange on the table having opposed recesses extending therethru, movable ball members upon the table and arranged in diametrically opposed relation within the flange whereby to support a lens in counter-balanced relation and means for moving said lens toward and away from a measuring instrument.

2. A device of the class described including a movable lens supporting table having an annular flange on the upper face thereof provided with opposed recesses, movable balls mounted in the upper face of the table within said flange whereby to support a lens in counterbalanced relation and a measuring instrument supported above the table and having stationary and movable contact points for engagement with the lens.

3. A device of the character described comprising a lens supporting member, diametrically opposed bearing balls seated within the lens supporting member to form a pivot for the lens, a lens measure mounted in spaced relation to the lens supporting member, and means to move said member toward the lens measure.

4. A device of the character described, comprising a lens supporting fulcrum member, a member on the lens support on which a lens may be supported, a lens measure mounted in spaced relation to the lens support, and moving means to engage the supported lens and lens measure.

5. A device of the character described, comprising a lens supporting fulcrum member, a member on the lens support on which the lens may be supported, a lens measure having separated contact points mounted in spaced relation to the lens support and moving means to engage the supported lens with a contact point of the lens measure, whereby the lens is moved on its fulcrum support into contact with all of the contact points of the lens measure.

6. A device of the character described, comprising a lens support having a fulcrum on which a lens may be supported, a lens measure having a plurality of contact points mounted in spaced relation to the lens support, and means for moving the lens support to first engage one contact point of the lens measure to move the lens on its fulcrum until it engages the other contacts of the lens measure.

ARTHUR EDWARD DEMERS.